Nov. 13, 1956  P. D. BECKER  2,770,435
FASTENING DEVICE
Filed July 17, 1953
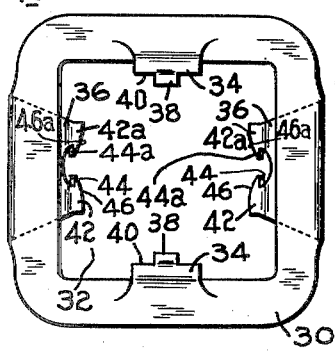
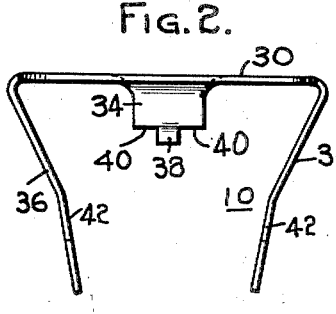
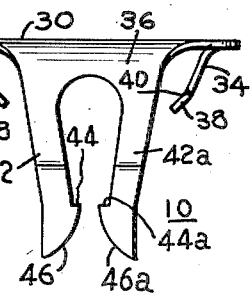
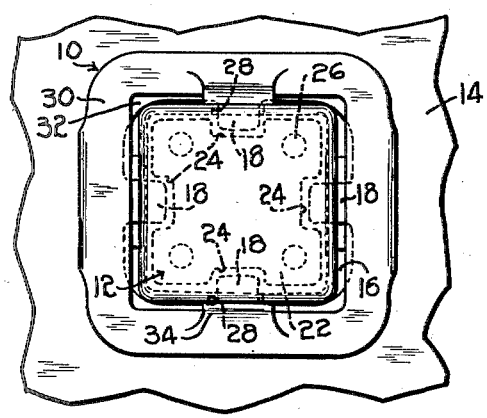
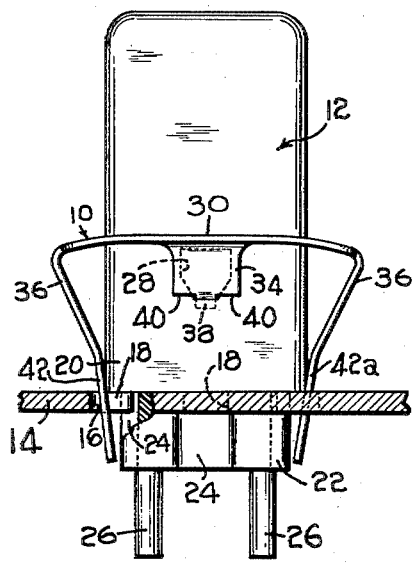
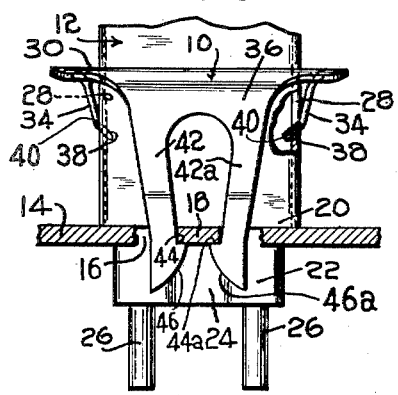
INVENTOR:
PHILIP D. BECKER,
BY Robert E. Ross
ATTORNEY.

United States Patent Office 2,770,435
Patented Nov. 13, 1956

2,770,435

FASTENING DEVICE

Philip D. Becker, Hingham, Mass., assignor, by mesne assignments, to United-Carr Fastener Corporation, Boston, Mass., a corporation of Delaware Application July 17, 1953, Serial No. 368,759

2 Claims. (Cl. 248—27)

This invention relates generally to fastening devices and has particular reference to a fastening device for securing a radio shield can to a supporting panel.

In the construction of radios, television sets, and other electronic apparatus, it is necessary that certain small coils be shielded from external magnetic fields, and in some cases the field produced by the coil must be shielded from affecting other parts of the apparatus. It is customary to simply mount a metal can over the coil, which seats firmly on the chassis or support panel, so that magnetic fields are intercepted by the metal can and grounded to the chassis. Many types of fastening devices have been used for the purpose of attaching the can to the shield; however, each has some disadvantage, in that it is too expensive, or does not retain the shield tightly against the panel, or is too difficult to assemble and remove.

The object of the invention is to provide a fastener for attaching a radio shield can or the like to a support panel, which overcomes the above disadvantages in that it is economical to manufacture, easy to assemble, and retains the can tightly against the support at all times.

Other objects of the invention will, in part, be obvious, and will, in part, appear hereinafter.

In the drawing:

Fig. 1 is a top plan view of a fastening device embodying the features of the invention;

Fig. 2 is a view of the fastener of Fig. 1 as seen in side elevation;

Fig. 3 is a view of the fastener of Fig. 2 as seen from the right side;

Fig. 4 is a top plan view of a shield can assembled onto a panel by means of the fastener of Fig. 1;

Fig. 5 is a view of the assembly of Fig. 4 as seen from the right side; and

Fig. 6 is a view of the assembly of Fig. 5 as seen from the right side.

Referring to the drawing, there is illustrated a fastening device 10, which is particularly adapted for attaching a shield can 12 or the like to a support panel 14.

In the illustrated embodiment, the support panel 14 is provided with an aperture 16 which is substantially square, with projections 18 extending a predetermined distance into the opening from the medial portion of the panel edges disposed about the opening. The shield can 12 is substantially square in cross section, with the lower end 20 open to receive electronic apparatus (not shown) which may have a casing 22 of plastic or other insulating material. The lower portion of the casing may be provided with longitudinal grooves 24 conforming generally to the shape of the projections 18 so that the can with the apparatus disposed therein may be mounted over the opening with the lower portion of the casing 22 extending therethrough. To provide means for completing an electric circuit to the apparatus in the can, connectors or lead wires 26 protrude downwardly from the plastic casing. To enable the fastener 10 to engage the can in a manner to appear hereinafter, apertures 28 are provided in opposite sides of the can in spaced relation to the open end 20.

The fastener 10 is preferably formed of a single piece of resilient sheet metal and comprises a substantially flat base 30 having a central aperture 32 which is substantially square to conform to the shape of the shield can, a pair of tongues 34 disposed on opposite inner edges of the base and extending downwardly therefrom, and a pair of attaching legs 36 disposed on opposite outer edges of the base and extending downwardly therefrom.

The tongues 34 are inclined slightly inwardly toward each other and are provided with projections 38 on the ends thereof which are narrower than the tongues for entering the apertures 28 in the sides of the can, and form shoulders 40 on the edges thereof.

The attaching legs 36, which extend downwardly from the plane of the base, are inclined inwardly toward each other, and each have bifurcated ends forming leg segments 42 and 42a with shoulders 44 and 44a disposed on the adjacent edges thereof, with outwardly camming edges 46 and 46a leading to the shoulders from the ends of the leg segments.

The can is initially assembled with the fastener by inserting the open end 20 into the aperture 32 in the base of the fastener until the projections 38 on the ends of the tongues 34 snap into the apertures 28 in the sides of the can.

The can may then be assembled onto the panel by placing the can over the panel opening 16 so that the ends of the leg portions 42 and 42a are disposed over a pair of projections 18 on opposite sides of the opening. The legs 36 are normally too short to engage the panel; however, since the fastener is formed of resilient sheet metal, the base 30 is transversely flexible between the legs 36. Hence the base may be bowed so that the ends of the leg segments move downwardly toward the panel and straddle the projections 18. The camming edges 46 and 46a spring the leg segments apart until the shoulders 44 and 44a snap into position behind the projections. After such assembly, the base 30 is retained in the transversely bowed condition so that the base tends to urge the can tightly against the panel through the engagement of the tongues 34 with the can (see Fig. 5) thereby insuring adequate grounding of the can to the panel.

The can may be easily removed by simply prying the ends of the leg segments apart, either from above or below the panel, with a suitable tool to disengage the shoulders 44 and 44a from the panel projection 18.

Although in the illustrated embodiment the can is substantially square, cans of other shapes may be used.

Since certain other obvious modifications may be made in the device without departing from the scope of the invention, it is intended that all matter contained herein be interpreted in an illustrative and not in a limiting sense.

I claim:

1. A fastening device for attaching a radio shield can to a support panel, comprising a base having an opening therethrough to receive the can, a pair of tongue members disposed on inner edges of two opposite sides of the base, said tongues extending inwardly toward each other for engagement with opposite sides of the can, and a pair of legs extending from two other opposite sides of the base downwardly from the plane of the base, and having end portions adapted for snapping engagement with the support panel, said base being flexible transversely between the legs to move said legs toward the support panel without substantially affecting the engagement of the tongues with the can.

2. A fastening device for attaching a radio shield can to a support panel, comprising a substantially flat base having a central opening extending therethrough to receive the shield can, a pair of tongues extending downwardly from the inner edge of two opposing sides of the base, said tongues being inclined toward each other to enter suitable openings in opposite sides of the can, and a pair of attaching legs extending downwardly from the outer edges of two other opposing sides of the base, said legs being inclined inwardly toward each other and having bifurcated end portions, said bifurcated end portions having opposing shoulders disposed thereon, said base being transversely flexible between the legs whereby said legs may be moved toward the panel by flexing the base to enable the shoulders to snap into engagement in a suitable aperture in the panel, thereby maintaining the base in a bowed condition to hold the can tightly against the panel.

References Cited in the file of this patent

UNITED STATES PATENTS

| | | |
|---|---|---|
| 2,133,366 | Van Uum | Oct. 18, 1938 |
| 2,360,647 | Churchill | Oct. 17, 1944 |
| 2,395,326 | Handley et al. | Feb. 19, 1946 |
| 2,491,447 | Hall | Dec. 13, 1949 |
| 2,531,911 | Johnson | Nov. 28, 1950 |
| 2,539,172 | Andrews | Jan. 23, 1951 |
| 2,639,311 | Cook | May 19, 1953 |
| 2,656,577 | Carbary | Oct. 27, 1953 |
| 2,673,334 | Julian et al. | Mar. 23, 1954 |

FOREIGN PATENTS

| | | |
|---|---|---|
| 555,061 | Great Britain | Nov. 9, 1942 |

OTHER REFERENCES

United-Carr Fastening Corp. Catalogue "Dot," No. 49J, Copyright 1949, available in Div. 41, page 11, items 49081, 99456, 99418.